A. COOPER.
Cultivators.

No. 145,848.　　　　　　　　Patented Dec. 23, 1873.

Witnesses
E. P. Pillsbury
Thos. J. Price

Inventor.
Andrew Cooper.

UNITED STATES PATENT OFFICE.

ANDREW COOPER, OF MACOMB, ILLINOIS, ASSIGNOR OF ONE-HALF HIS RIGHT TO MARTHA E. UPDEGRAFF, OF SAME PLACE.

IMPROVEMENT IN CULTIVATORS.

Specification forming part of Letters Patent No. 145,848, dated December 23, 1873; application filed October 6, 1873.

*To all whom it may concern:*

Be it known that I, ANDREW COOPER, of the city of Macomb, in the county of McDonough and State of Illinois, have invented a new and useful Improvement in Cultivators; and I do hereby declare that the following is a full and exact description of the same, reference being had to the accompanying drawings and to the letters of reference marked thereon.

This invention relates to that class of cultivators that runs astride the rows, and which is adapted, by means of its peculiar construction, to operate without a tongue. The novelty consists in connecting the two frames by means of hinges to a center-pivoted bar, so that when the draft is applied it keeps the cultivator in an upright and easily manageable position.

Figure 1:
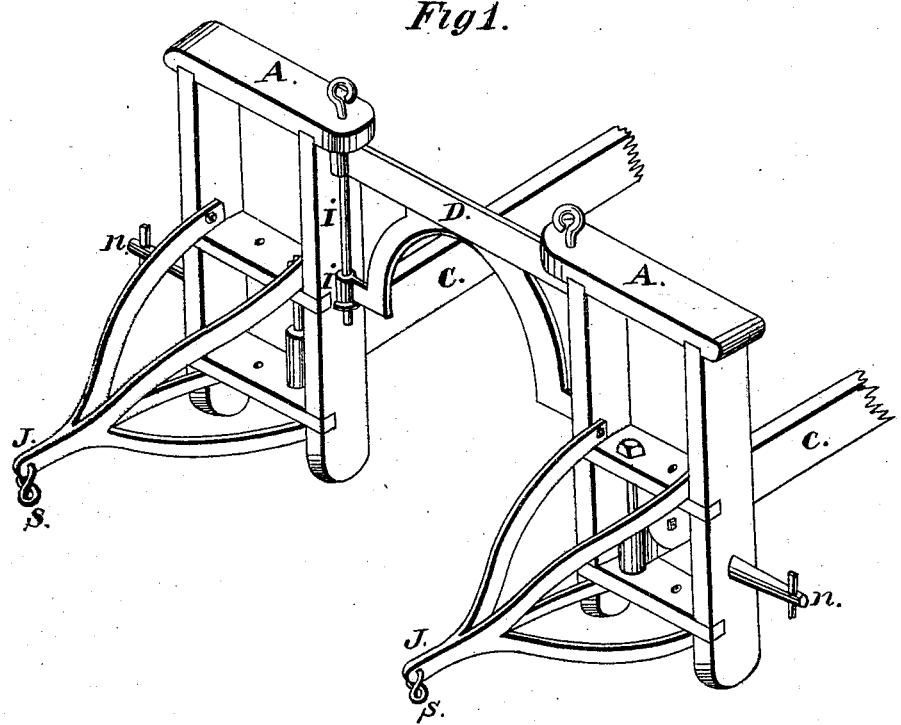
Figure 2:
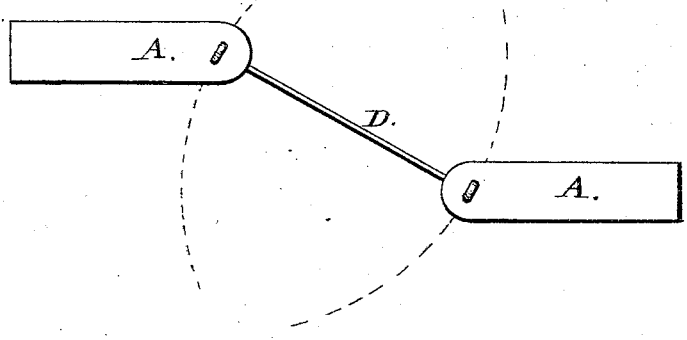

In the drawings, Figure 1 represents, in a perspective view, all of my improvement. In Fig. 2 I represent a plan, showing the manner in which the frame operates.

To enable others skilled in the art to make and use my invention, I will now proceed to describe fully its construction and operation.

A A, Fig. 1, represent two rectangular frames, attached to a straddle-bar, D, with hinge-joints, shown at $i$ $i$. In front of the frames A A, projecting forward, are hitching-frames, shown at J J. These frames are composed of four rods welded together at the points a sufficient length to form a solid eye. They are then spread out and slightly curved, so that each rod acts as a brace, and is bolted firmly to the frames A A, as shown. The single-tree is attached to the links $s$ $s$. $n$ $n$ represent the axle-points. C C represent a part of the plow-beams.

The operation of my improved cultivator will now be described. In consequence of the non-employment of a tongue, the horses are each hitched to the frames J J by means of a single-tree, each horse drawing his half of the cultivator, and if one horse should get a small distance ahead of the other, drawing one-half of the cultivator forward, as shown in Fig. 2, it does not affect the other, merely drawing the two frames A A nearer together, which does not affect the operation of the plows. The turning at the end of the rows is accomplished more speedily than with that class of cultivators that have tongues, and with more ease.

It can be taken apart and transferred from place to place without any inconvenience, and can be put together again in a few minutes, making a simple, cheap, and durable cultivator, and not liable to get out of order.

Having thus described my invention, what I claim as new, and desire to secure by Letters Patent, is—

1. In a parallel cultivator, the frames A A carrying the wheel-spindles $n$, the draft attachment J, and the plow-beams C, all constructed and combined as shown, for the purpose set forth.

2. The combination of the frames A A, draft attachment J, and center-bar D, having arched arms, and connecting the frames by means of hinged joints $i$, substantially as shown and described, and for the purpose specified.

ANDREW COOPER.

Witnesses:
THOS. J. PRICE,
WM. FISHER.